United States Patent [19]

Lipinski

[11] 4,246,030

[45] * Jan. 20, 1981

[54] CORROSION INHIBITING COMPOSITIONS AND THE PROCESS FOR USING SAME

[75] Inventor: Richard J. Lipinski, Aurora, Ohio

[73] Assignee: The Mogul Corporation, Chagrin Falls, Ohio

[ * ] Notice: The portion of the term of this patent subsequent to Feb. 6, 1995, has been disclaimed.

[21] Appl. No.: 967,584

[22] Filed: Dec. 8, 1978

Related U.S. Application Data

[63] Continuation-in-part of Ser. No. 783,646, Apr. 1, 1977, Pat. No. 4,138,353.

[51] Int. Cl.$^3$ .............................................. C23F 11/08
[52] U.S. Cl. ............................. 106/14.12; 106/14.13; 106/14.14; 106/14.16; 252/181; 252/389 A; 422/12
[58] Field of Search .............. 106/14.12, 14.13, 14.14, 106/14.16; 252/389 A, 181, 180; 422/12

[56] References Cited

U.S. PATENT DOCUMENTS

| | | | |
|---|---|---|---|
| 3,110,684 | 11/1963 | Miller | 252/389 |
| 3,214,454 | 10/1965 | Blaser et al. | 260/429.9 |
| 3,336,221 | 8/1967 | Ralston | 210/58 |
| 3,639,645 | 2/1972 | Miller et al. | 252/180 |
| 3,699,048 | 10/1972 | Krueger et al. | 252/180 |
| 3,723,347 | 3/1973 | Mitchell | 252/389 A |
| 3,784,469 | 1/1974 | Krueger et al. | 252/180 |
| 3,803,047 | 4/1974 | Hwa | 252/389 A |
| 3,806,459 | 4/1974 | Petrey | 252/180 |
| 3,891,568 | 6/1975 | Nishio et al. | 252/181 |
| 3,960,576 | 6/1976 | Carter et al. | 252/181 |
| 3,992,318 | 11/1976 | Gaupp et al. | 252/389 A |
| 4,138,353 | 2/1979 | Lipinski | 252/181 |

*Primary Examiner*—Lorenzo B. Hayes
*Attorney, Agent, or Firm*—Fay & Sharpe

[57] ABSTRACT

This invention is directed to corrosion inhibiting compositions and to a process for inhibiting corrosion and the deposition of mineral scale on metal in aqueous systems. The invention comprises adding to a water system effective amounts of an inhibiting composition comprising a water-soluble carboxylic acid and/or the salt thereof containing at least one hydroxyl group per molecule, an amino alkylene phosphonic acid or its derivative, a dispersing amount of a water-soluble polymeric dispersing agent and other inhibitors such as the molybdates, azoles and various inorganic metal compounds.

34 Claims, No Drawings

CORROSION INHIBITING COMPOSITIONS AND THE PROCESS FOR USING SAME

This application is a continuation-in-part of U.S. Patent Application Ser. No. 783,646, filed Apr. 1, 1977, now U.S. Pat. No. 4,138,353.

This invention is directed to a corrosion inhibiting composition and to a process of inhibiting corrosion and the deposition of mineral scale on metal in various aqueous systems and particularly the process for protecting metal in the presence of water by adding to the water effective amounts of at least one amino methylene phosphonic acid or a derivative thereof in combination with at least one hydroxyl-containing water-soluble carboxylic acid or the alkali metal salts thereof. In addition to the phosphonic acid and its derivatives and the carboxylic acid and its metal salts, other compounds used in combination therewith may include the metal molybdates either alone or with other known inhibiting compounds such as the azoles and the inorganic metal compounds.

BACKGROUND

The use of inorganic corrosion inhibitors, e.g. metal salts and oxides either alone or in combination with various organic inhibitors such as the azoles and the phosphonic acids have been used in aqueous systems. It has been found in accordance with this invention, however, that certain amino alkylene phosphonic acids and the derivatives thereof and particularly the amino methylene phosphonic acids having increased number of methylene groups in combination with a water-soluble carboxylic acid having at least one hydroxyl group per molecule and its alkali metal salts have improved metallic corrosion inhibition. In addition, a combination of phosphonic acid and carboxylic acid or the salts thereof have been found to prevent the deposition of mineral scale normally encountered in aqueous systems.

Corrosion is generally defined as a destructive attack on the metal, e.g. iron, involving an electrochemical or chemical reaction of the metal with its environment. Specifically, an electrochemical attack on the metal surface is the wearing away or an under cutting of metal which is accelerated after the protective coating, e.g. the oxide films are removed by the corrosive medium. Corrosion includes cavitation and erosion where, in addition to an electrochemical reaction, the condition of the aqueous systems are such that the continuous flow causes cavities where high pressure areas develop causing pressure and shock resulting in pitted metal surfaces. This particular type of corrosion is found in water pumps, propellers, turbine plates, etc. Erosion of the metal surface, however, occurs when the medium contains suspended solids which impinge the surface of the metal as the fluid is transported, thereby removing the protecting film and exposing the metal to corrosion.

Various corrosion inhibiting compositions are now being used at threshhold levels in an attempt to control the deposition of mineral scale. At these levels, however, there is a tendency to increase the rate of corrosion and, therefore, stronger inhibitors at higher concentrations are necessary in order to obtain satisfactory inhibition. The use of these inhibitors, e.g. the chromates at higher concentrations is unsatisfactory particularly because of environmental restriction.

Compounds such as the chromates, zinc compounds, polyphosphates, silicates or the like are used to control scale and/or corrosion in cooling water systems. Recently, however, more Government restrictions have been placed on the use of inhibitors containing heavy metals. Moreover, some of the polyphosphates are objectionable because of degradation they combine with calcium resulting in the precipitation of calcium salts.

Thus, with the increase in regulation on the kind of compounds that can be used in water systems, there is a need for environmentally accepted inhibitors. The inhibitors of this invention comprising the amino alkylene phosphonic acids in combination with the water-soluble carboxylic acids substantially limit the rate of corrosion, extend the life of the equipment and minimize down time for maintenance purposes. Moreover, it was discovered that molybdenum compounds, when used in combination with the carboxylic acids and phosphonic acids, are satisfactory replacements for the chromates in that molybdates are not on the list of toxic compounds requiring Federal regulation. Thus, to avoid these and related problems, it has been discovered that certain alkylene phosphonic acids and the derivatives thereof in combination with effective amounts of water-soluble carboxylic acids having at least one hydroxy group per molecule and the alkali metal salts of said acids may be used alone or in combination with other known compounds in aqueous systems to prevent corrosion and scale formation.

SUMMARY

It has been found in accordance with this invention that certain amino alkylene phosphonic acids and its derivatives in combination with water-soluble carboxylic acids having at least one hydroxyl group per molecule and/or the alkali metal salts thereof either alone or with a metal molybdate when used in effective amounts, e.g. as low as about 2.0 parts per million parts by weight of water is capable of protecting various metals and its alloys such as copper, brass, steel, aluminum and iron. This corrosion inhibiting composition, which also helps to minimize mineral deposits generally formed on the surface of metal, may be used in various water systems, including, for example, air conditioning systems, stem generating plants, refrigeration systems, heat-exchange apparatus, engine jackets, pipes and the like.

Accordingly, it is an object of this invention to provide a composition which will inhibit corrosion and minimize the deposit of mineral scale on metal coming in contact with the water in the system. It is another object of this invention to provide a process for inhibiting corrosion and mineral deposits on metal in contact with corrosive aqueous systems. It is a further object to provide a composition and process for using the composition to inhibit corrosion or the tarnishing of metal particularly metals such as steel, copper, brass, etc. by utilizing a small, but effective amount of an amino methylene phosphonic acid in combination with a water-soluble carboxylic acid containing a free or unreacted hydroxyl group and/or the alkali metal salt of these acids.

These and other various objects will become apparent from a further, more detailed description of the invention as follows.

DETAILED DESCRIPTION

Specifically, this invention relates to a novel composition for inhibiting corrosion of metal and to prevent the deposition of mineral scale by adding to the water a composition which comprises, parts based on a million parts by weight of water, from about: (a) 0 to 50 parts by weight of an azole; (b) up to 100 parts by weight of at least one water-soluble carboxylic acid having at least one hydroxyl group per molecule and/or the alkali metal salt of said carboxylic acid; (c) 0 to 100 parts by weight of a metal molybdate; and (d) 2.0 to 50 parts by weight of an amino alkylene phosphonic acid and/or derivatives or salts thereof.

It is important that either the carboxylic acid, the alkali metal salt of said carboxylic acid or a combination of the carboxylic acid and its alkali metal salt either alone or further in combination with a metal molybdate be present in the water in an amount of at least 3.0 parts per million. In addition to the carboxylic acid or its alkali metal salt, it is essential to have a corrosion inhibiting amount of at least one amino alkylene phosphonic acid and/or its derivative having the formula:

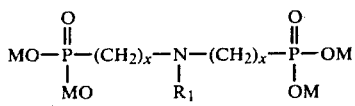

wherein $R_1$ is a monovalent radical selected from the class consisting of the formulae:

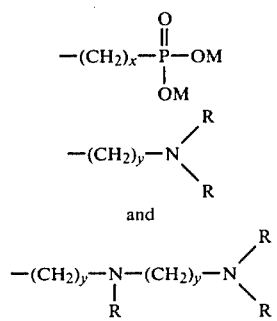

wherein R is

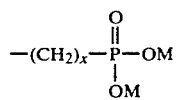

and Y has a value of 1 to 8, X has a value of 1 to 4, and M is a radical selected from the class consisting of hydrogen, an alkali or alkaline earth metal, ammonium, an amino radical, and an alkyl or substituted alkyl radical having 1 to 4 carbon atoms.

The derivatives of the phosphonic acids, as defined herein, e.g. the salts and esters, etc. may be one or the other or a combination thereof provided the derivative is substantially soluble in water. For purposes of this invention, the amino methylene phosphonic acids and the derivatives may be used in effective amounts, i.e. amounts sufficient to inhibit corrosion which generally ranges from about 2.0 to 50 parts by weight per million parts by weight of water to be treated.

In addition to the phosphonic acid and its derivatives, the water-soluble carboxylic acids and/or the alkali metal salts thereof, e.g. sodium, lithium or potassium salts may be used each alone or in combination and further with a metal molybdate in amounts of at least about 3.0 parts per million. Preferably, the carboxylic acid and/or its salts are used in amounts ranging from 3 to 30 and more likely from 5 to 15 parts by weight per million parts by weight of water to be treated. It is essential that the carboxylic acid be substantially water soluble and have at least one free or unreacted hydroxyl group per molecule. Specifically, an illustration of these acids includes tartaric acid, glycolic acid, gluconic acid, gallic acid, lactic acid and such aromatic acids as salicylic acid and the corresponding alkali metal salts such as the sodium, potassium and lithium salts of these acids. Still further, other examples of acids that may be used, provided they contain at least one free hydroxyl group, is N-hydroxy ethylenediamine triacetic acid, N,ND1 (2hydroxy ethyl) glycinate, gluco heptonic acid and the corresponding alkali metal salts.

The metal molybdates that may be used in combination with the carboxylic acids and/or its salts and the phosphonic acids and/or its derivatives include the alkali and alkaline earth metal molybdates such as sodium molybdate. The molybdates are used in amounts ranging from 3 to 30 and preferably in amounts ranging from 3 to 15 parts by weight per million parts by weight of water to be treated.

The azoles should be present in amounts ranging from 0 to 50 parts and particularly the triazoles are used in amounts ranging from 0.1 to 30 parts and more likely in amounts ranging from 0.2 to 5.0 parts by weight per million parts by weight of water. The azoles are particularly useful in water systems wherein copper or an alloy of copper are present to prevent metal tarnishing, etc.

In addition to the amino ethylene phosphonic acids, its derivatives, the carboxylic acids and its alkali metal salts, either alone or with the metal molybdate, other inorganic and organic corrosion inhibitors may be used in combination therewith in small, but effective amounts. Further, various known conventional additives particularly the water-soluble polymeric dispersants may be used in combination with the corrosion inhibiting components.

It is of particular importance, in accordance with this invention, to recognize that as the molecule weight of the amino methylene phosphonic acid increases, i.e. by increasing the number of methylene groups in the molecule, the effectiveness of the phosphonate as a corrosion inhibitor likewise increases. There is a relationship between the chemical structure of the amino methylene phosphonates and their effect on corrosion inhibition of metal. It was found that the corrosion rate of metal decreases as the chain length of the methylene group increases between the phosphonate groups. For purposes of this invention, the amino methylene phosphonic acids and its derivatives may be characterized by the general formula:

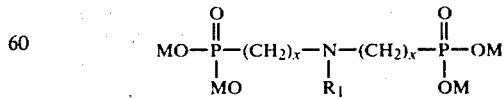

wherein $R_1$, X and M are as defined hereinabove.

As the number of methylene groups increased, the effectiveness of the phosphonate as a corrosion inhibitor likewise improved as illustrated by the data in Table I.

TABLE I

| FORMULA | Corrosion Potential (MVS) Initial - Form | Percent Corrosion Inhibitor Open Cell Water |
|---|---|---|
| I. Amino Tri (Methylenephosphonic Acid) $N-(CH_2-PO_3H_2)_2$ | 360–450 – | 53.3 |
| II. Ethylenediamine Tetra (Methylene-Phosphonic Acid $(H_2O_3P-H_2C)_2>N-(CH_2)_2-N<(CH_2-PO_3H_2)_2$ | 370–475 – | 63.3 |
| III. Diethylenetriamine Penta (Methylene Phosphonic Acid) $2(H_2O_3P-H_2C)>N(H_2C)_2-(N)-(CH_2)_2-N<(CH_2PO_3H_2)_2$ $\mid$ $CH_2PO_3H_2$ | 360–400 – | 74.2 |
| IV. Hexamethylenediamine Tetra (Methylene Phosphonic Acid) $2(H_2O_3P-H_2C)>N-(CH_2)_6-N<(CH_2PO_3H_2)_2$ | 370–325 + | 90.0 |
| V. Control | 415–685 – | 0.0 |

The data in the Table shows that the percent of corrosion inhibition increases with the increase of methylene groups when comparing, for example, amino tri(methylene) phosphonic acid) with hexamethylenediamine tetra(methylene phosphonic acid). The corrosion tests were conducted a pH of 7.5, temperatures of about 100° ±2° F. with carbon steel panels. The amino methylene phosphonates were added to the water system at concentrations of about 10 parts per million of the phosphonate per million parts by weight of water.

The following corrosion inhibiting composition was prepared and tested to illustrate that the combination of the amino methylene phosphonate containing an increased number of methylene groups improves corrosion inhibition in aqueous systems when used in combination with a hydroxy-containing carboxylic acid such as citric acid, see data in Table II.

EXAMPLE A

| | Parts by Weight (ppm) Million parts of $H_2O$ |
|---|---|
| Polyacrylic Acid (60A %) (2000 Mol Weight) | 26 |
| Citric Acid | 8 |
| Benzotriazole | 1 |
| H.M.W. Sulfonated Polystyrene | 1 |
| Amino Phosphonate | 0.93* |

*Based on the weight of phosphorous in the compound(s).

TABLE II

| Amino-Phosphonate | Corrosion Potential (MVS) Initial-Final | Percent Corrosion Inhibition Filtered Chagrin Plant Water |
|---|---|---|
| None (Control) | 398–445 | 81.7 |
| Chemical Formula I | 400–380 | 85.0 |
| Chemical Formula II | 440–345 | 90.0 |
| Chemical Formula III | 430–508 | 71.0 |
| Chemical Formula IV | 425–330 | 94.0 |

The data in Table III shows, for example, that the combination of citric acid, phosphonate (Formula IV) and various concentrations of the metal molybdate increases the percent of corrosion inhibition.

EXAMPLE B

| Cooling Water Test Formulation | |
|---|---|
| | Parts by Weight (ppm) Million Parts of $H_2O$ |
| Polyacrylic Acid (2000 Mol Weight) | 8.0 |
| Citric Acid | 16.0 |
| Formula IV Phosphonate | 6.0 |
| Benzotriazole | 1.0 |
| H.M.W. Sulfonated Polystyrene | 0.5 |
| Sod. Molybdate Dihydrate | Variable |

TABLE III

| Sodium Molybdate Dihydrate (Cont. ppm) | Corrosion Potentials (MVS) Initial-Final | Percent Corrosion Inhibition Filtered Chagrin Plant Water |
|---|---|---|
| 0.0 | 360–420 | 83.3 |
| 2.0 | 380–390 | 85.0 |
| 4.0 | 370–360 | 90.8 |
| 6.0 | 370–360 | 90.8 |
| 8.0 | 370–320 | 91.7 |
| 10.0 | 400–320 | 91.7 |

The corrosion inhibiting composition of Example C was prepared and tested to illustrate that the combination of citric acid and the amino phosphonate (Formula IV) resulted in improved corrosion inhibition as the concentration of the citric acid increased, see Table IV.

EXAMPLE C

| Composition | |
|---|---|
| | Parts by Weight (ppm) Million parts of $H_2O$ |
| Formula IV Phosphonate | 3 |
| Benzotriazole | 1 |
| Citric Acid | Variable |

TABLE IV

| Citric Acid (Conc. ppm) | Corrosion Potentials Initial-Final | Percent Corrosion Inhibition Filtered Chagrin Plant Water |
|---|---|---|
| 0.0 | 530–580 | 60.4 |
| 4.0 | 460–525 | 67.9 |

TABLE IV-continued

| Citric Acid (Conc. ppm) | Corrosion Potentials Initial-Final | Percent Corrosion Inhibition Filtered Chagrin Plant Water |
| --- | --- | --- |
| 8.0 | 415–420 | 83.3 |
| 12.0 | 410–380 | 84.1 |
| 16.0 | —360 | 87.5 |
| 20.0 | 405–355 | 87.9 |

A basic test composition was prepared as set forth in Example D and tested in combination with various amino phosphonates based on the weight of phosphorous per compound (Formulae I through IV) as illustrated by the data in Table V.

EXAMPLE D

| Basic Test Composition | PPM |
| --- | --- |
| Sodium Molybdate Dihydrate | 13.13 |
| Sulfonated Polystyrene | 0.60 |
| Tolyltriazole | 0.75 |

TABLE V

| | Percent Corrosion Inhibition | |
| --- | --- | --- |
| Composition | Filtered Chagrin Plant Water 19 Hours | Open Cell Water 93 Hours |
| Basic Test Composition without Amino Methylene Phosphonate | 27.1 | 15.4 |
| Ex. D + Formula IV | 95.8 | 89 |
| Ex. D + Formula I | 86.7 | 85.5 |
| Ex. D + Formula II | 86.7 | 83.6 |
| Ex. D + Formula III | 90.4 | 84.5 |

It should be noted from the data in Table V that the test composition, without the amino methylene phosphonate, had low corrosion inhibition (15.4%), whereas the same test composition containing various amino methylene phosphonates gave improved inhibition and particularly where the phosphonate contained an increased number of methylene groups (Formula IV).

The compositions were tested for corrosion inhibition by using a three electrode electro-chemical test method. The procedure employed is as follows:

Corrosion potentials of 1010 carbon steel test coupons are monitored against a standard calomel reference electrode in a specific water type at 100°±2° F. and a pH range of 7.5 to 8.0. Corrosion currents corresponding to these potentials are measured against a nichrome wire getter electrode with a zero resistance ammeter at polarization potentials of less than 20 millivolts. Using Faraday's Law, these corrosion currents are converted to total weight loss values. Percent corrosion inhibition levels as shown in the Tables are then calculated using the following expression:

$$\% \text{ Corr. Inhib.} = \frac{\text{Wgt. Loss } (- \text{ inhib.}) - \text{Wgt. Loss } (+ \text{ inhib.})}{\text{Wgt. loss } (- \text{ inhib.})} \times 100$$

The filtered test water employed comprises:

| | |
| --- | --- |
| TH (CaCO$_3$) | 162 |
| Ca (CaCO$_3$) | 108 |
| Mg (CaCO$_3$) | 54 |
| CL (Cl$^-$) | 74 |
| PHT, Alk (CaCO$_3$) | 0 |
| M.O. Alk (CaCO$_3$) | 218 |
| pH | 7.7 |
| Spec. Conduc. | 680 |

Open cell water is distilled water containing 50 ppm of active chloride ion.

The compositions of this invention are environmentally acceptable and at the same time prevent corrosion of metal in contact with various aqueous systems. Therefore, the compositions may be substituted for the more toxic materials such as the chromate inhibitors where the toxicity makes them undesirable, particularly when disposal of the inhibitor raises a serious water pollution problem. The compositions are particularly suitable for reducing the corrosion of various metals such as iron, copper, aluminum, zinc and the alloys thereof such as steel and other ferrous alloys, e.g. brass and the like which are generally used in aqueous systems.

The amino methylene phosphonic acid and the derivatives thereof include the water-soluble salts such as the alkali and alkaline earth metal salts, the amine and lower alkanol amine salts. In addition, the lower molecular weight esters of these acids can be employed and are generally derived from lower molecular weight aliphatic alcohols having up to four carbon atoms. Mixtures of the acids, salts and esters can be employed provided they are sufficiently water soluble to function effectively as a corrosion inhibitor. In addition to the amino methylene phosphonates, and the carboxylic acids and its alkali metal salts, other known organic and/or inorganic corrosion inhibitors may be used in combination therewith. For example, the organic inhibitors may include the azoles and particularly the triazoles such as benzotriazole, tolytriazole and various other known azoles such as pyrazoles, imidazoles, oxazoles, thiazoles and combinations thereof. The triazoles particularly useful include the water-soluble 1,2,3-triazoles or a substituted 1,2,3-triazole such as benzotriazole, tolytriazole, 4-phenyl-1,2,3-triazole, 1,2-naphthatriazole 4-nitro benzotriazole, etc. The pyrazoles include any of the water-soluble compounds such as 3,5-dimethyl pyrazole, 6-nitroindazole, 4-benzyl pyrazole and the like. The imidazoles include the water-soluble compounds such as benzimidazole, 5-methylbenzimidazole, 2-phenyl imidazole; 4-methyl imidazole and the like. The oxazoles include any water-soluble compound such at the 2-mercaptoxazole; 2-mercaptobenzoazole, etc. The thiazoles include 2-mercaptothiazole, 2-mercaptobenzothiazole, benzothiazaole, etc.

In combination with the organic corrosion inhibitors, various inorganic compounds may be used with the corrosion inhibiting compositions of this invention. These are known compounds and include the metal salts such as the nitrates, nitrites, silicates, carbonates, i.e. sodium silicates, sodium nitrite, sodium nitrate, sodium carbonate, potassium nitrite, ammonium silicate, etc. and the metal oxides such as zinc oxide, etc.

In addition to corrosion problems, a cooling-water system may have other difficulties depending on the impurities in the water. For example, if water is vaporized in the system, scale formation may be a problem. This can be avoided either by softening the water, e.g. using an ion-exchange treatment or by complexing the scale formers by adding to the water at least one dispersing agent. These dispersing agents may include the lignosulfonates, hydrolyzed polyacrylonitrile and particularly the acrylic type polymers derived from acrylic monomers such as acrylic acid, acrylamide and the like. More specifically, the polymeric dispersing agents, for purposes of this invention, may include the sulfonated polystyrene, polymers of ethylene oxide and particularly the polymers of an acrylic monomer having the formula:

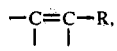

wherein R is selected from the group consisting of the nitrile, amide and carboxyl radicals. The carboxyl radical may be further characterized as —COOM where M is selected from the group consisting of lower alkyl radicals or metals.

Some of the preferred polymeric dispersing agents useful in the treatment of water in combination with the corrosion inhibiting compositions of this invention include the polymers and copolymers of acrylic, acrylamide and methacrylic acid and the water-soluble salts. Other monomers which may be used for the preparation of the polymeric dispersing agents include polymers derived from maleic acid, itaconic acid, aconitic acid, Nadic anhydride, vinyl acetate, vinyl methyl ether, etc. These water-soluble polymers are used as dispersants in aqueous systems in combination with the corrosion inhibiting composition of this invention is comparatively small amounts, e.g. amounts as low as 0.01 parts per million and upward over 10 parts per million depending on the condition of the water and the type of water system being treated.

To illustrate the usefulness of some other hydroxy-containing carboxylic acids, i.e. tartaric acid, glycolic acid, gluconic acid and citric acid, compared to several non-hydroxyl-containing acids as chelants in combination with the corrosion inhibiting components of this invention, a test formula was prepared comprising the following:

EXAMPLE E

| Test Formula | %/Weight/100 |
|---|---|
| Water (soft) | 78.11 |
| Sodium Hydroxide | 8.34 |
| Tolyltriazole | 0.40 |
| Hexamethylene diamine (Tetramethylene Phosphonic Acid) | 3.00 |
| Higher molecular Weight sulfonated polystyrene | 0.15 |
| Low molecular weight copolymer of acrylic acid and acrylamide | 6.00 |

To the test formula, citric acid, tartaric acid, glycolic acid and gluconic acid were added in the dosages indicated in Table VI.

TABLE VI

| | | PERCENT CORROSION INHIBITION | |
|---|---|---|---|
| | DOSAGE (ppm) | TEST FORMULA 200 ppm in OCW | TEST FORMULA 500 ppm in OCW |
| HYDROXYL CONTAINING CARBOXYLIC ACID CHELANTS | | | |
| None | — | <50% | 86.7% |
| Citric Acid | 8 | 93.3% | — |
| Tartaric Acid | 8 | 90.0% | — |
| Gluconic Acid | 8 | 88.3% | — |
| Glycolic Acid | 8 | 86.7% | — |
| Citric Acid | 20 | — | 91.7% |
| Tartaric Acid | 20 | — | 95.8% |
| Gluconic Acid | 20 | — | 92.5% |
| Glycolic Acid | 20 | — | 93.3% |
| NON-HYDROXYL CONTAINING ACID CHELANTS | | | |
| Oxalic Acid | 8 | 33.3% | — |
| Boric Acid | 8 | 25.0% | — |
| Oxalic Acid | 20 | — | 90% |
| Boric Acid | 20 | — | 86.7% |
| Control OCW | — | 0.0% | 0.0% |

19 Hour tests were conducted on 1010 Carbon Steel Coupons in distilled water containing 50 ppm Cl ions at pH 8.0 and 100 ±2° F.

The data illustrates that as the dosage of the chelants were increased from 8.0 parts by weight per million to 20 parts per million when compared to the control, the corrosion inhibition was substantially improved.

In addition to the corrosion inhibiting compositions described by this invention, other known materials may be added to the water systems for their known functions. These may include, for example, biocides which inhibit the growth of algae and various other known additives generally used in the art.

While this invention has been described by a number of specific embodiments, it is obvious there are variations and modifications which can be made without departing from the spirit and scope of the invention as set forth in the appended claims.

The invention claimed is:

1. A composition for inhibiting mineral scale and corrosion of metal in the presence of water which comprises, parts based on a million parts by weight of water from about:

(a) 0.1 to 30 parts by weight of an azole,
(b) up to 100 parts by weight of water-soluble carboxylic acids having at least one hydroxyl group per molecule and/or the alkali metal salts of said carboxylic acids, and
(c) 0 to 100 parts by weight of a metal molybdate, wherein the carboxylic acids, the alkali metal salts of said carboxylic acids, or combinations of the carboxylic acids and the alkali metal salts thereof, either alone or with the molybdates are present in an amount of at least about 3.0 parts per million, and (d) a corrosion inhibiting amount of at least one amino methylene phosphonic acid and the derivatives thereof having the formula:

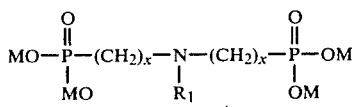

wherein $R_1$ is a monovalent radical selected from the class consisting of the formulae:

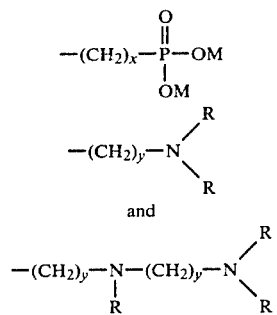

wherein R is

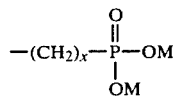

and Y has a value of 1 to 8, X has a value of 1 to 4 and M is a radical selected from the class consisting of hydrogen, an alkali or alkaline earth metal, ammonium, an amino radical, and an alkyl or substituted alkyl radical having 1 to 4 carbon atoms.

2. The composition of claim 1 further characterized in that the amino methylene phosphonic acid and the derivatives thereof are present in an amount ranging from about 2 to 50 parts by weight per million parts by weight of water.

3. The composition of claim 2 further characterized in that the carboxylic acid and the alkali metal salts thereof are present in an amount ranging from about 3.0 to 30 parts by weight per million parts by weight of water.

4. The composition of claim 3 further characterized in that the metal molybdate is present in an amount ranging from about 3.0 to 30 parts by weight per million parts by weight of water.

5. The composition of claim 3 further characterized as comprising an effective amount of water-soluble polymeric dispersing agent.

6. The composition of claim 1 further characterized in that the carboxylic acid is glycolic acid or the alkali metal salt thereof.

7. The composition of claim 1 further characterized in that the carboxylic acid is gluconic or the alkali metal salt thereof.

8. The composition of claim 1 further characterized in that the carboxylic acid is a monocarboxylic acid or the alkali metal salt thereof.

9. The composition of claim 2 further characterized in that the phosphonic acid is hexamethylene diamine tetra(methylene phosphonic acid).

10. The composition of claim 3 further characterized in that the metal molybdate is an alkali metal molybdate and the phosphonic acid is hexamethylene diamine tetra(methylene phosphonic acid).

11. The composition of claim 3 further characterized in that the phosphonic acid is an aminotri(methylene phosphonic acid).

12. The composition of claim 3 further characterized in that the phosphonic acid is ethylenediamine tetra(methylene phosphonic acid).

13. The composition of claim 3 further characterized in that the phosphonic acid is diethylenetriamine penta(methylene phosphonic acid).

14. The composition of claim 2 further characterized in that the carboxylic acid is an aliphatic monocarboxylic acid or an alkali metal salt thereof present in an amount ranging from about 3.0 to 30 parts by weight per million parts of water, the molybdate is an alkali metal molybdate present in an amount ranging from about 3.0 to 30 parts by weight per million parts by weight of water and the phosphonic acid is hexamethylene diamine tetra(methylene phosphonic acid).

15. The composition of claim 1 further characterized in that the azole is a triazole selected from the class consisting of benzotriazole and tolyltriazole.

16. The composition of claim 8 further characterized in that the carboxylic acid or the alkali metal salt thereof is present in an amount ranging from about 3.0 to 30 parts by weight per million parts by weight of water and the phosphonic acid is hexamethylene diamine tetra(methylene phosphonic acid).

17. The composition of claim 3 further characterized as comprising an effective amount of a water-soluble polymeric dispersing agent.

18. The composition of claim 17 further characterized in that the polymeric dispersing agent is sulfonated polystyrene.

19. The composition of claim 5 further characterized in that the polymeric dispersing agent is a copolymer of acrylic acid and acrylamide.

20. The composition of claim 5 further characterized in that the polymeric dispersing agent is polyethylene oxide.

21. The composition of claim 3 further characterized as comprising a corrosion inhibiting amount of at least one other inorganic metal compound selected from the group consisting of nitrates, nitrites, silicates, carbonates, and metal oxides.

22. A process of inhibiting mineral scale and corrosion of metal in an aqueous system which comprises adding to the water, parts based on a million parts by weight of water from about:

(a) 0.1 to 30 parts by weight of an azole,
(b) 0 to 100 parts by weight of a carboxylic acid having at least one hydroxyl group per molecule and/or the alkali metal salts thereof, and
(c) 0 to 100 parts by weight of a metal molybdate, wherein either the carboxylic acids, the alkali metal salts of the carboxylic acids or combinations of the carboxylic acids and the alkali metal salts thereof, each alone or with the molybdate are present in an amount of at least 3.0 parts per million, and (d) a corrosion inhibiting amount of at least one amino methylene phosphonic acid and the derivatives thereof having the formula:

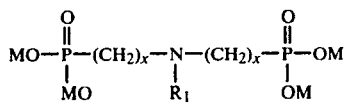

wherein $R_1$ is a monovalent radical selected from the class consisting of the formulae:

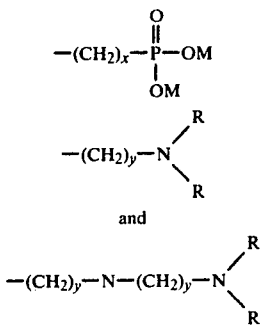

wherein R is

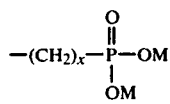

and Y has a value of 1 to 8, X has a value of 1 to 4, and M is a radical selected from the class consisting of hydrogen, an alkali or alkaline earth metal, ammonium, an amino radical, and an alkyl or substituted alkyl radical having 1 to 4 carbon atoms.

23. The process of claim 22 further characterized in that the carboxylic acid is an aliphatic monocarboxylic acid having at least one hydroxyl group per molecule.

24. The process of claim 23 further characterized in that monocarboxylic acid is glycolic acid or the alkali metal salt thereof.

25. The process of claim 23 further characterized in that the carboxylic acid is gluconic acid or the alkali metal salt thereof.

26. The process of claim 22 further characterized in that the carboxylic acid or its alkali metal salt is present in an amount ranging from about 3.0 to 3.5 parts by weight per million parts by weight of water, the molybdate is an alkali metal molybdate present in an amount ranging from about 3 to 30 parts by weight per million parts by weight of water and the phosphonic acid is hexamethylene diamine tetra(methylene phosphonic acid) present in an amount ranging from about 2.0 to 50 parts by weight.

27. The process of claim 22 further characterized in that the metal molybdate is an alkali metal molybdate present in an amount ranging from about 3.0 to 30 parts by weight per million parts by weight of water and the phosphonic acid is hexamethylene diamine tetra(methylene phosphonic acid).

28. The process of claim 22 further characterized in that the carboxylic acid or its alkali metal salt is present in an amount ranging from about 3.0 to 30 parts by weight per million parts by weight of water and the phosphonic acid is hexamethylene diamine tetra(methylene phosphonic acid).

29. The process of claim 22 further characterized in that the azole is present in an amount ranging from about 0.1 to 30 parts by weight per million parts by weight of water and is selected from the class consisting of benzotriazole and tolyltriazole.

30. The process of claim 22 further characterized in that the composition comprises an effective amount of a water-soluble polymeric dispersing agent.

31. The process of claim 30 further characterized in that the polymeric dispersing agent is a sulfonated polystyrene.

32. The process of claim 30 further characterized in that the polymeric dispersing agent is a copolymer of acrylic acid and acrylamide.

33. The process of claim 22 further characterized in that an effective amount of at least one other inorganic corrosion inhibitor selected from the group consisting of nitrates, nitrites, silicates, carbonates and metal oxides is added to the water.

34. The composition of claim 5 further characterized in that the dispersing agent is a copolymer of acrylic acid and acrylamide.

* * * * *